US011328467B2

(12) United States Patent
Comer et al.

(10) Patent No.: US 11,328,467 B2
(45) Date of Patent: *May 10, 2022

(54) POSE SPACE DIMENSIONALITY REDUCTION FOR POSE SPACE DEFORMATION OF A VIRTUAL CHARACTER

(71) Applicant: Magic Leap, Inc., Plantation, FL (US)

(72) Inventors: Sean Michael Comer, Encino, CA (US); Geoffrey Wedig, Torrance, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,929

(22) Filed: Feb. 3, 2021

(65) Prior Publication Data

US 2021/0304477 A1 Sep. 30, 2021

Related U.S. Application Data

(63) Continuation of application No. 16/522,540, filed on Jul. 25, 2019, now Pat. No. 10,950,024.

(60) Provisional application No. 62/711,326, filed on Jul. 27, 2018.

(51) Int. Cl.
G06T 13/40 (2011.01)
G06T 17/20 (2006.01)

(52) U.S. Cl.
CPC .............. G06T 13/40 (2013.01); G06T 17/20 (2013.01)

(58) Field of Classification Search
None
See application file for complete search history.

(56) References Cited

U.S. PATENT DOCUMENTS

| 5,459,636 A | 10/1995 | Gee et al. |
| 6,850,221 B1 | 2/2005 | Tickle |
| 7,882,050 B2 | 2/2011 | Kubota et al. |
| 9,081,426 B2 | 7/2015 | Armstrong |
| 9,123,175 B1 | 9/2015 | Goldenthal et al. |
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |

(Continued)

FOREIGN PATENT DOCUMENTS

| WO | WO 2016/025941 | 2/2016 |
| WO | WO 2020/023788 | 1/2020 |

OTHER PUBLICATIONS

International Search Report and Written Opinion for PCT Application No. PCT/US 19/43506, dated Oct. 16, 2019.

(Continued)

Primary Examiner — Nicholas R Wilson
(74) Attorney, Agent, or Firm — Knobbe, Martens, Olson & Bear, LLP

(57) ABSTRACT

Systems and methods for reducing pose space dimensionality. A plurality of example poses can define an input pose space. Each of the example poses can include a set of joint rotations for a virtual character. The joint rotations can be expressed with a singularity-free mathematical representation. The plurality of example poses can then be clustered into one or more clusters. A representative pose can be determined for each cluster. An output pose space with a reduced dimensionality, as compared to the input pose space, can then be provided.

19 Claims, 19 Drawing Sheets

(56) References Cited

U.S. PATENT DOCUMENTS

| | | |
|---|---|---|
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,950,024 B2 | 3/2021 | Comer et al. |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0213646 A1 | 7/2015 | Ma et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2020/0035009 A1 | 1/2020 | Comer et al. |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hili, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Henderson, "Euler Angles, Quaternions, and Transformation Matrices," Working Relationships, Mission Planning and Analysis Division, NASA—Jul. 1977.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US 19/43506, dated Feb. 2, 2021.

POSE SPACE DIMENSIONALITY REDUCTION FOR POSE SPACE DEFORMATION OF A VIRTUAL CHARACTER

INCORPORATION BY REFERENCE TO ANY PRIORITY APPLICATIONS

This application is a continuation of U.S. patent application Ser. No. 16/522,540, filed Jul. 25, 2019, and entitled "POSE SPACE DIMENSIONALITY REDUCTION FOR POSE SPACE DEFORMATION OF A VIRTUAL CHARACTER," which claims priority to U.S. Provisional Patent Application No. 62/711,326, filed Jul. 27, 2018, and entitled "POSE SPACE DIMENSIONALITY REDUCTION FOR POSE SPACE DEFORMATION OF A VIRTUAL CHARACTER." These applications, and any other for which a foreign or domestic priority claim is identified in the Application Data Sheet as filed with the present application, are hereby incorporated by reference under 37 CFR 1.57.

FIELD

The present disclosure relates to virtual reality and augmented reality, including mixed reality, imaging and visualization systems and more particularly to rigging systems and methods for animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MW".

Figure 1:
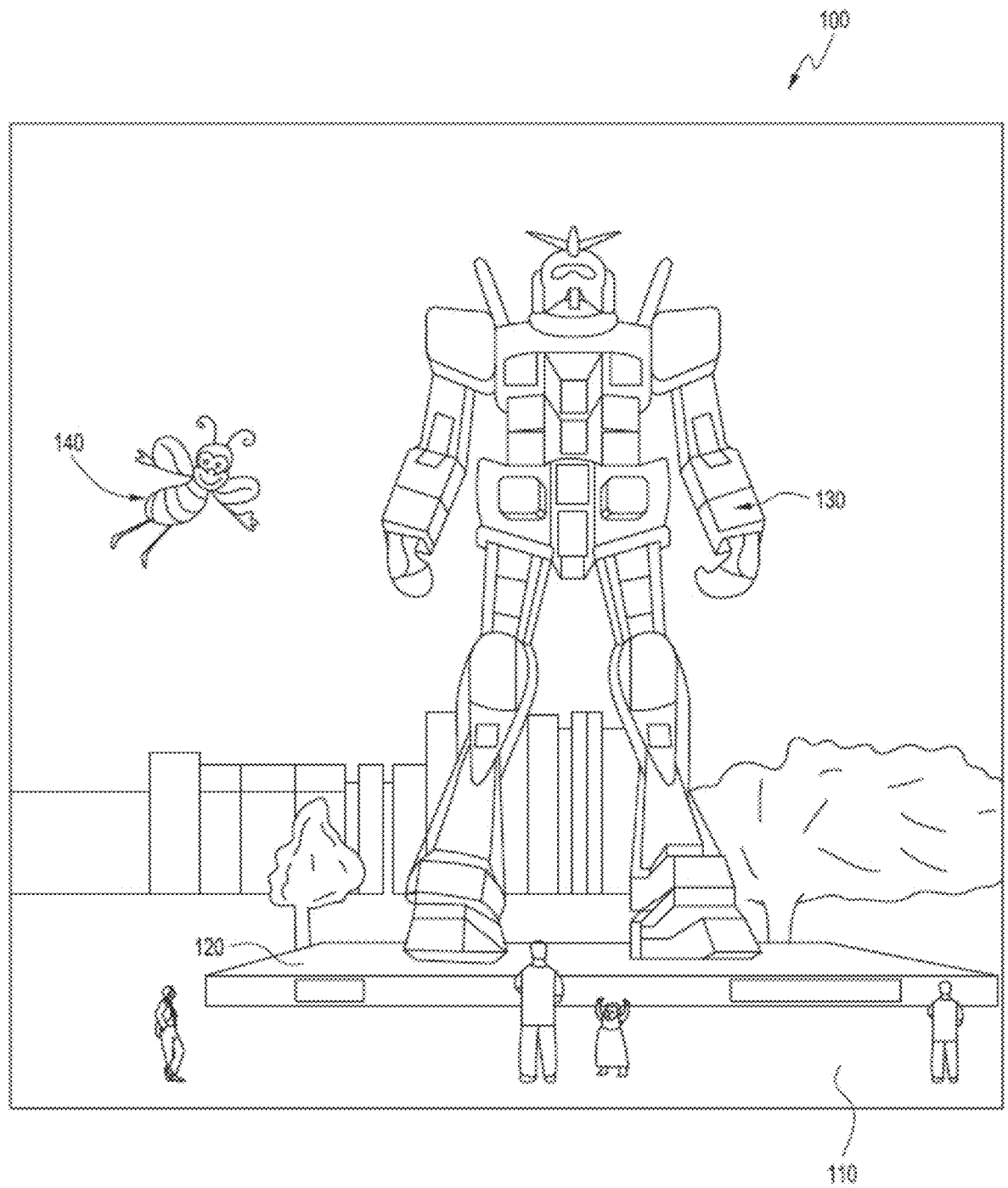
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
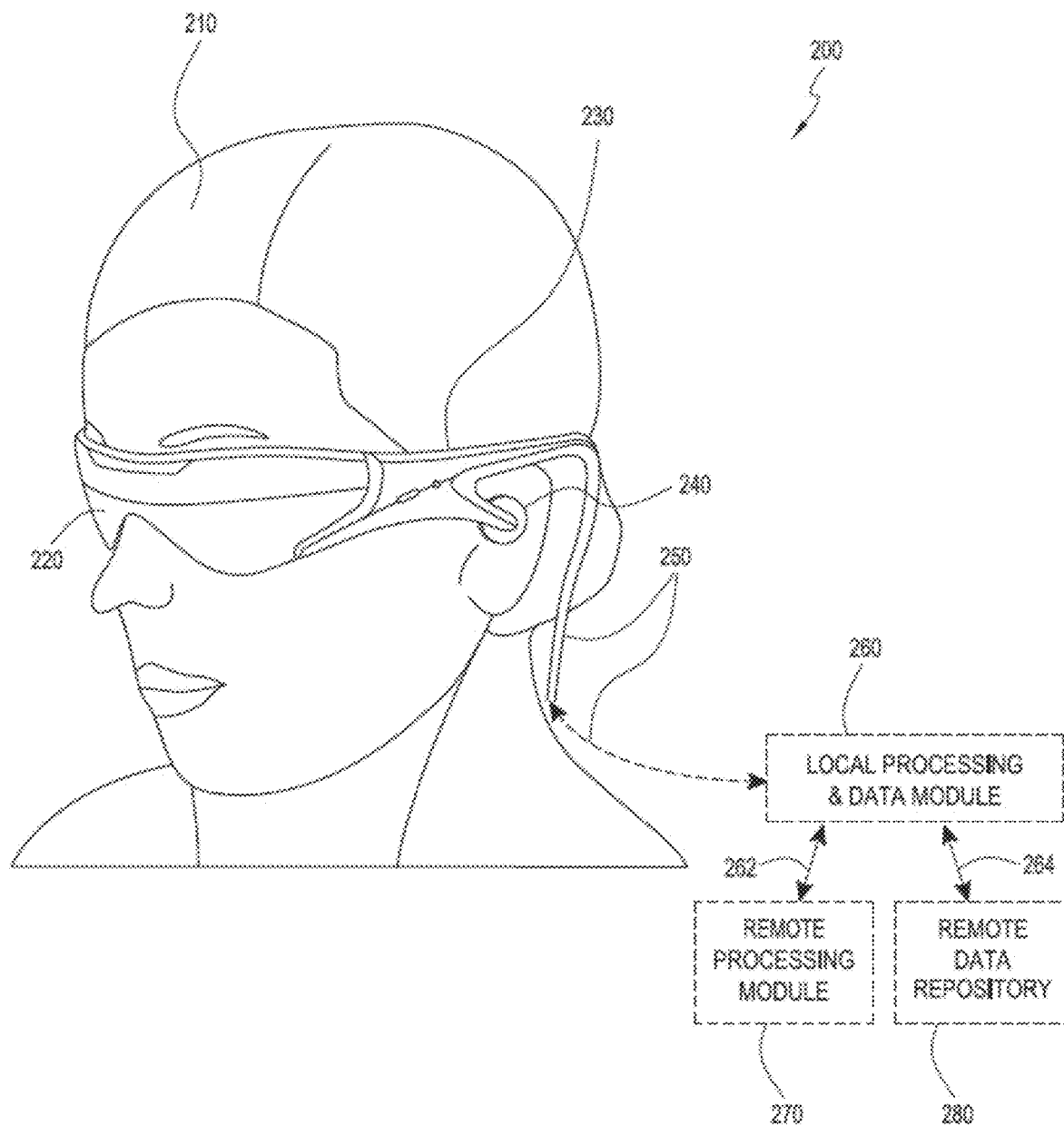
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
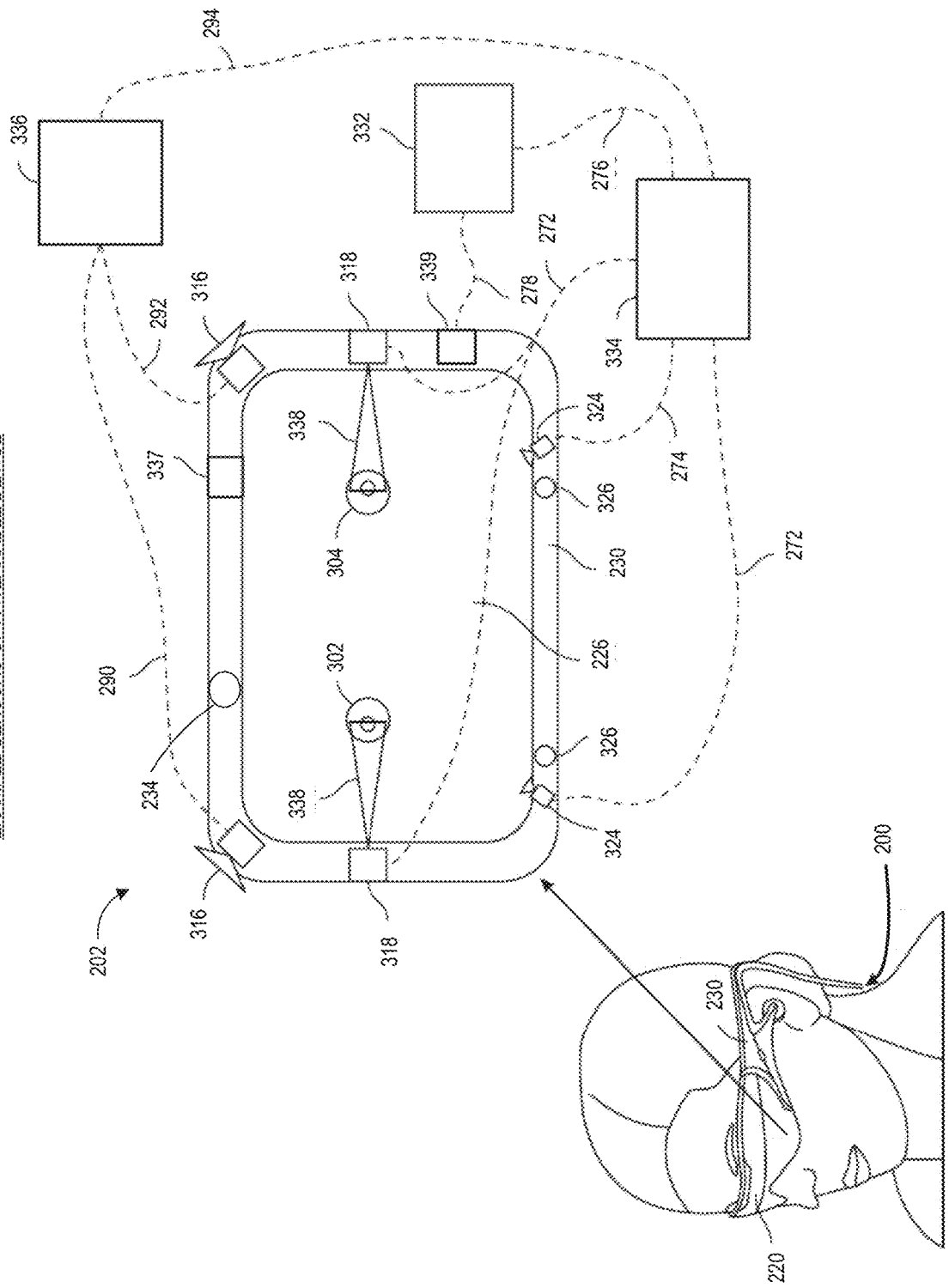
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
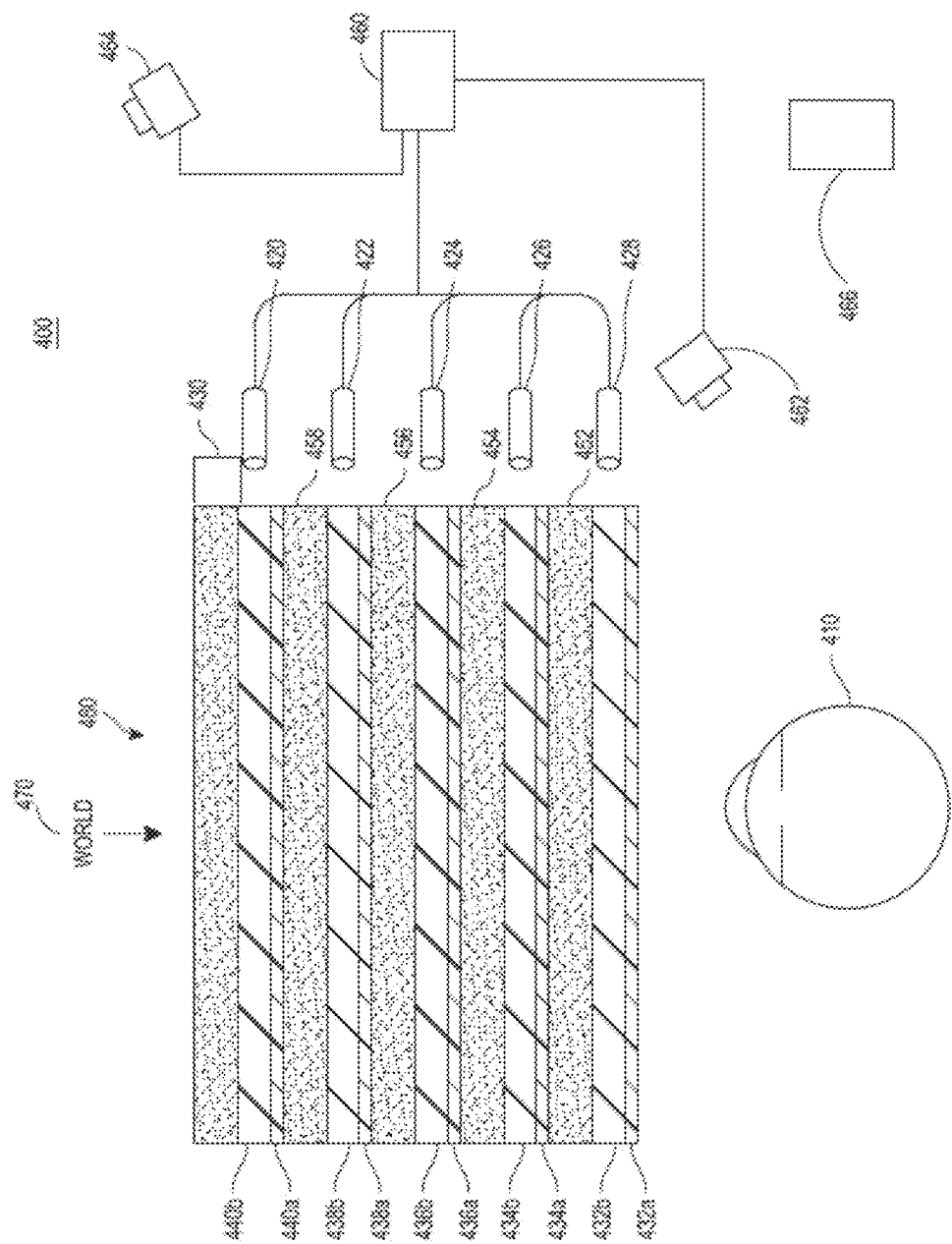
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below.

Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
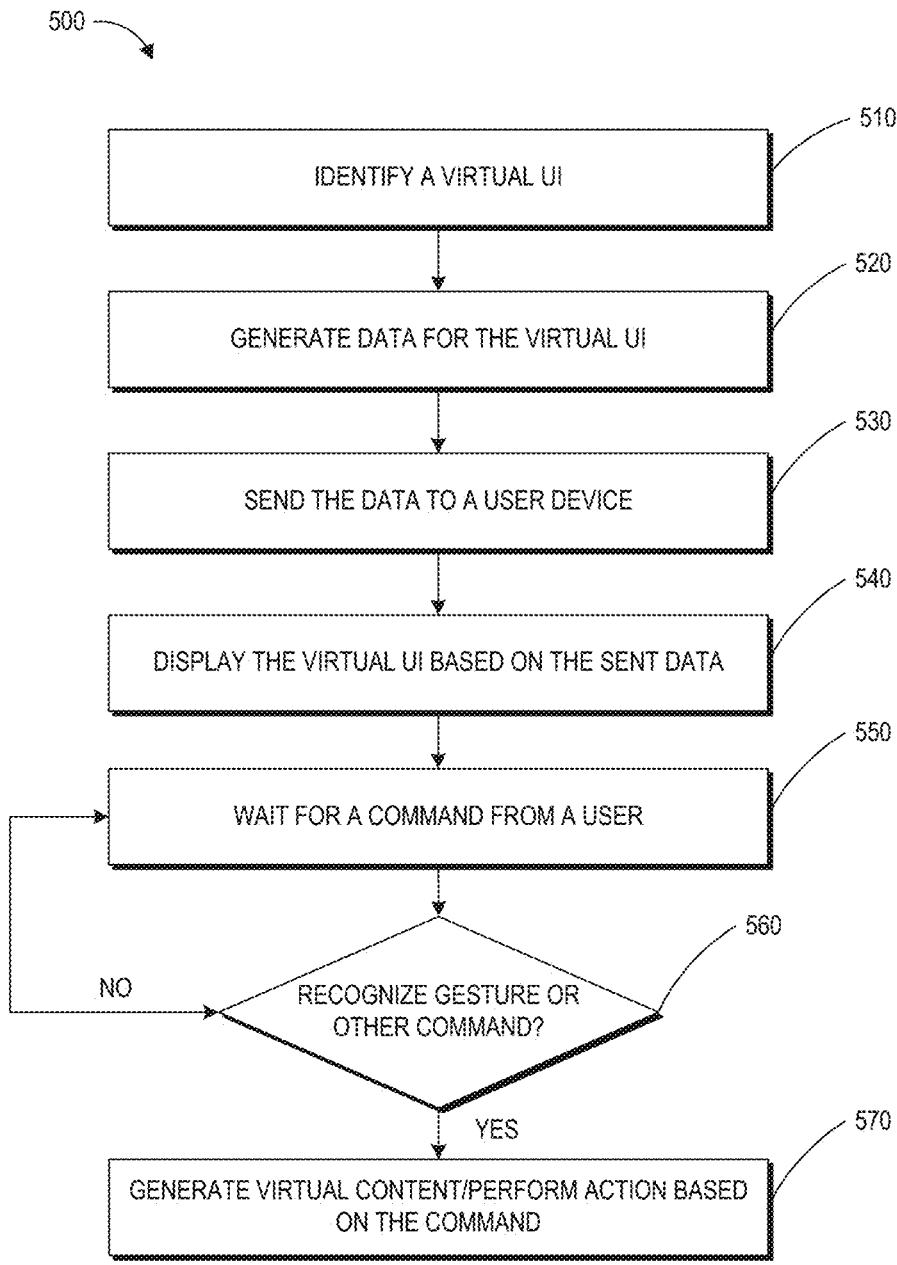
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
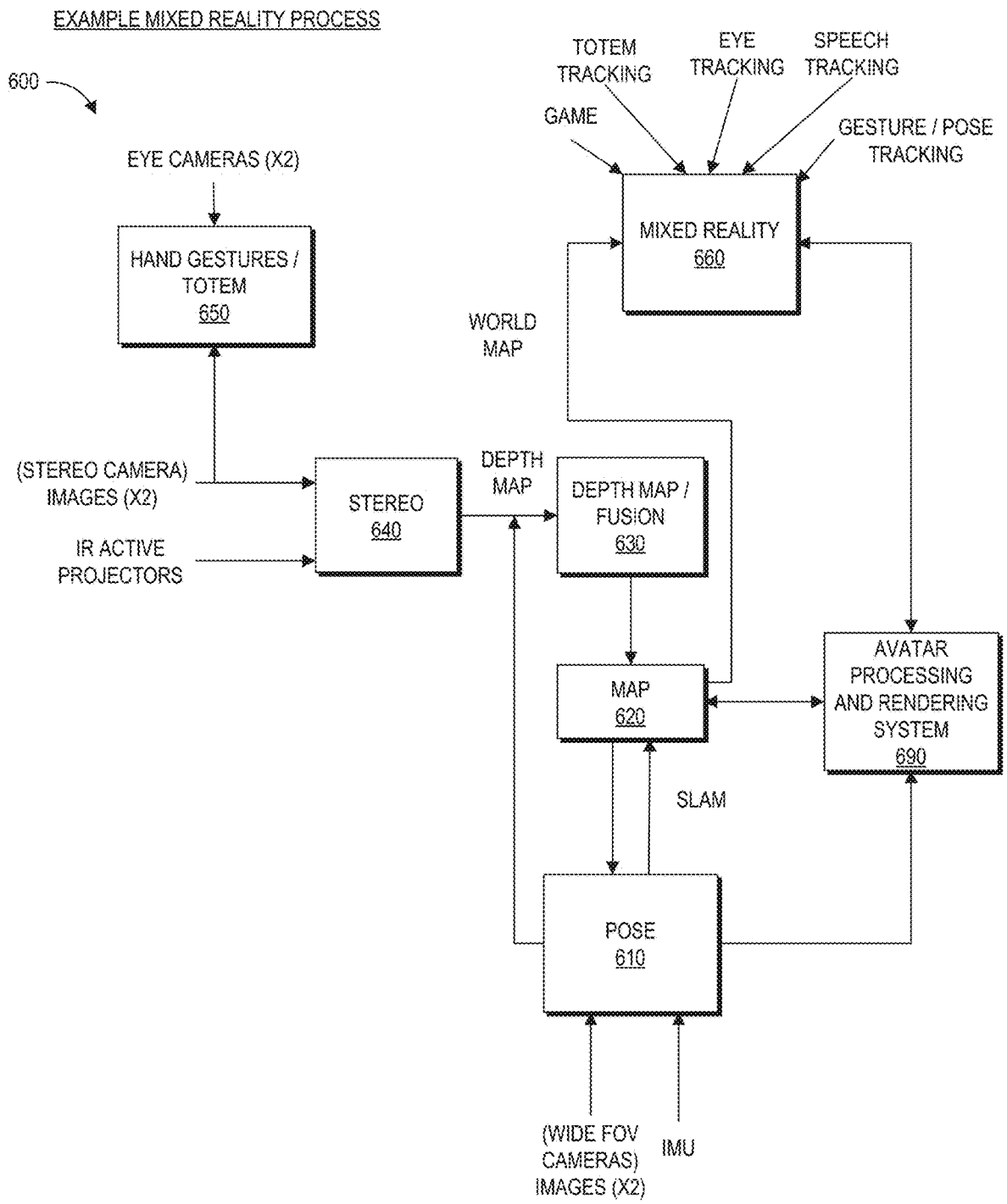
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
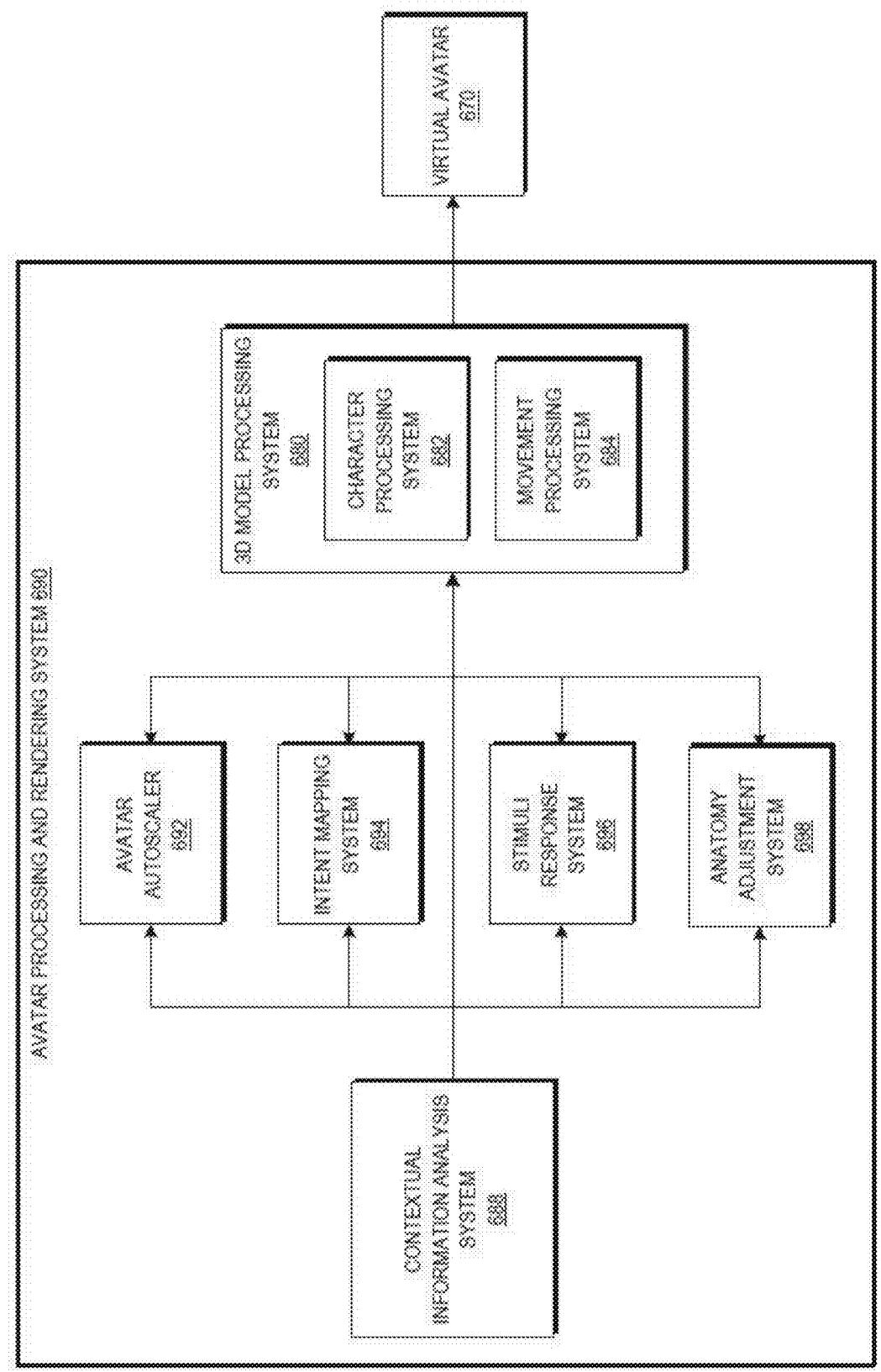
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
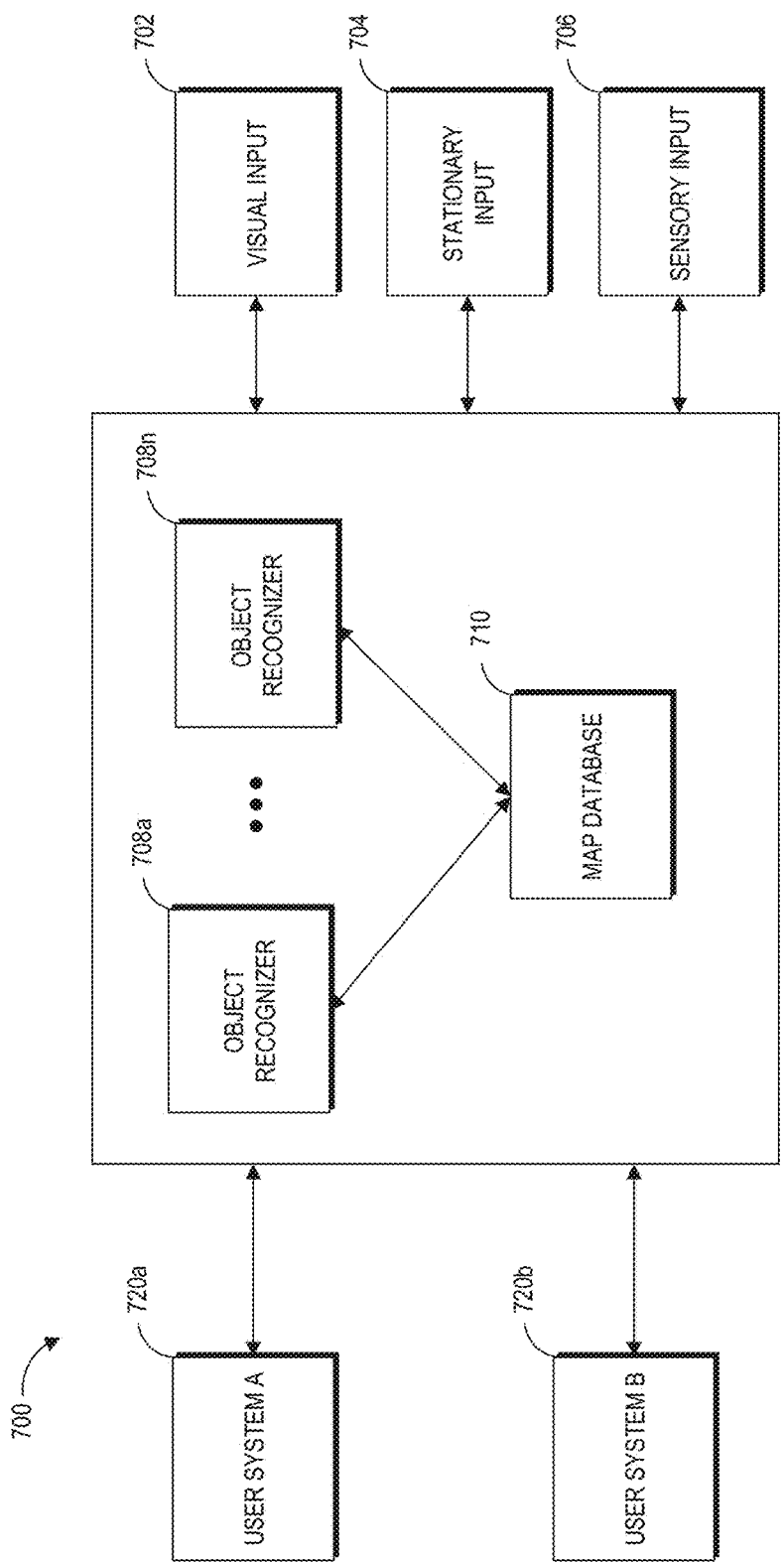
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
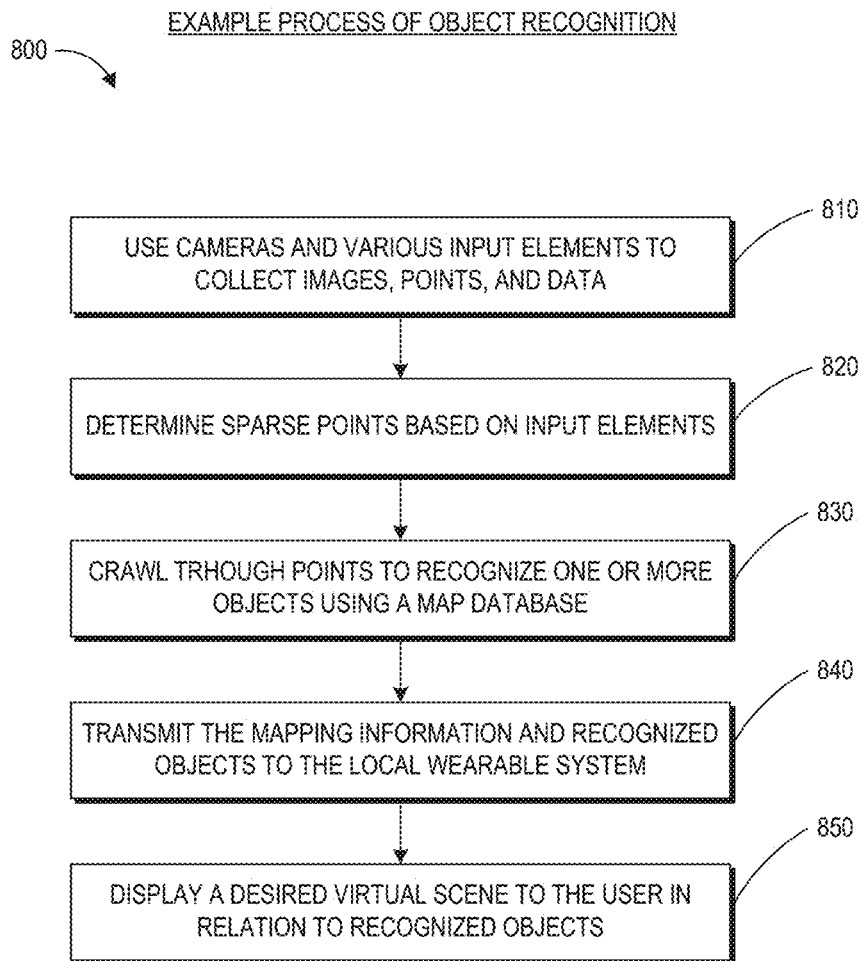
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
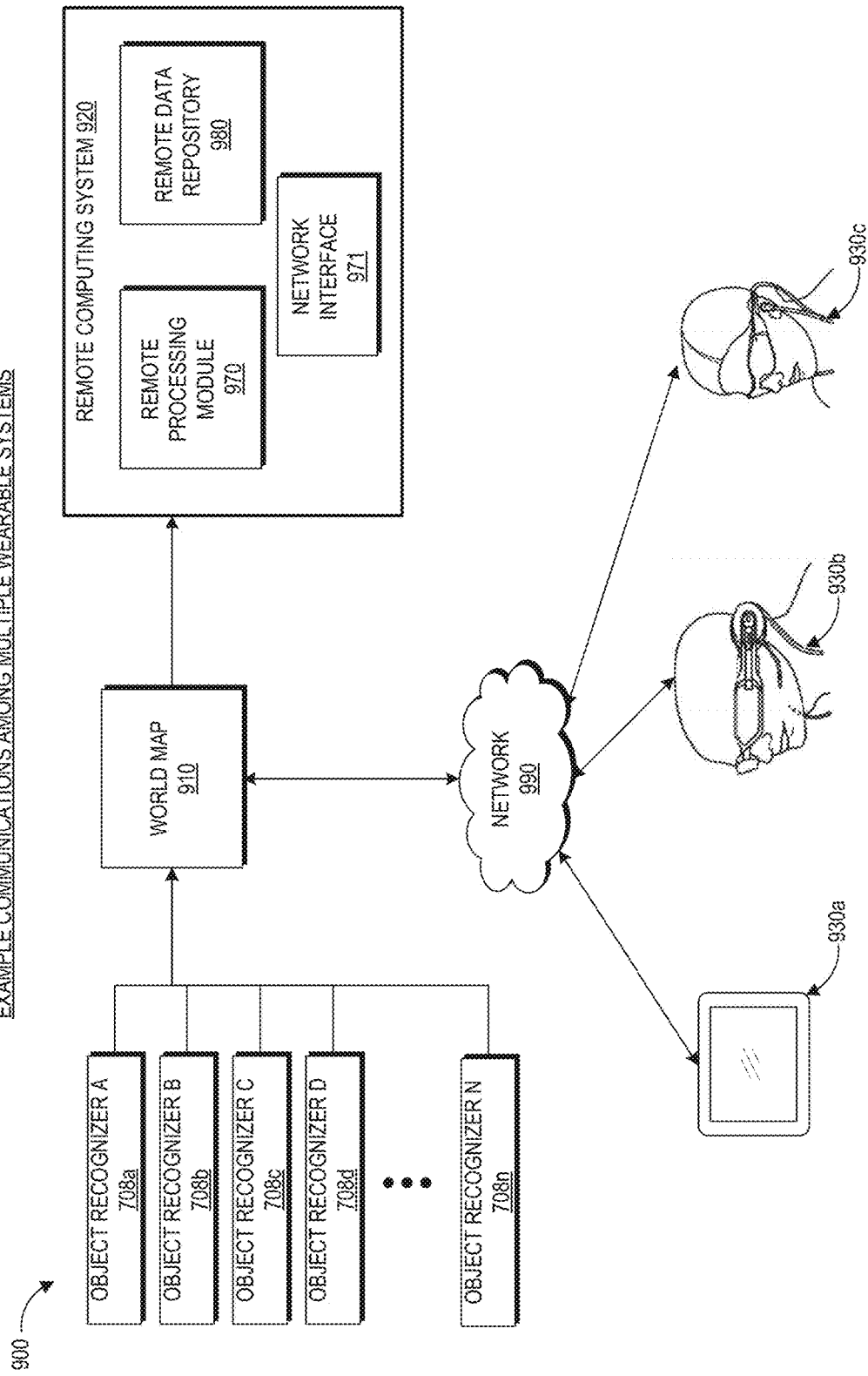
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c ... 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
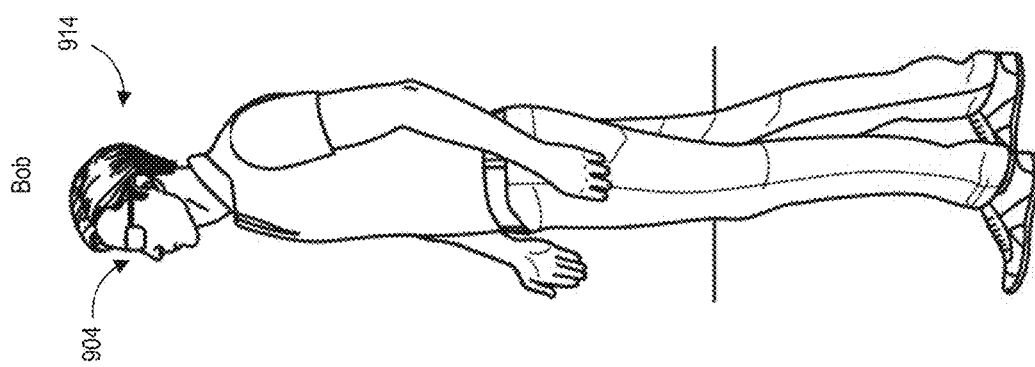
FIG. 9B illustrates an example telepresence session.
Figure 9B:
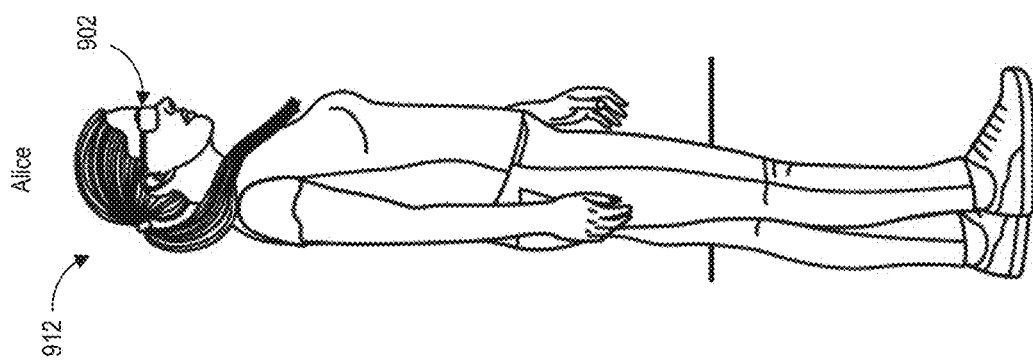

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
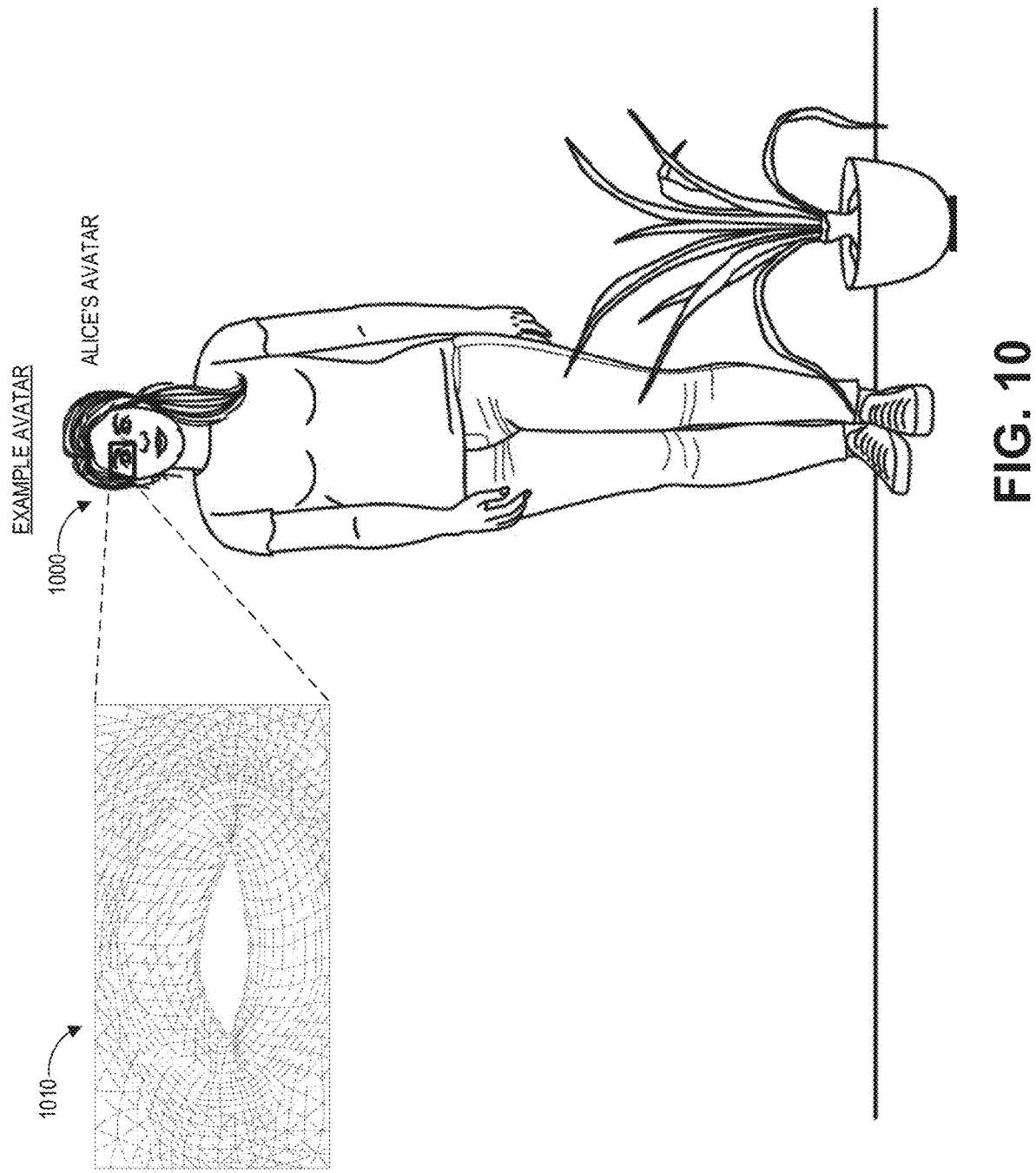
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Figure 11:
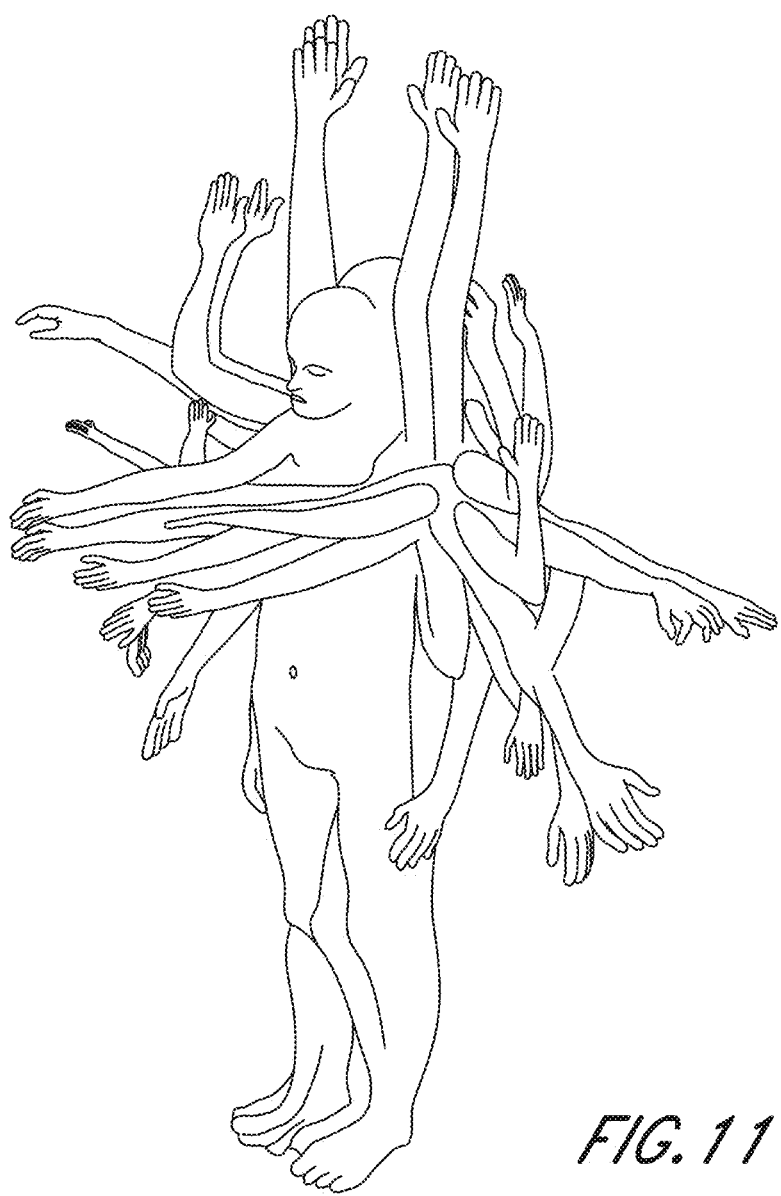
FIG. 11 shows several arm poses for a virtual character, which in this case is a human avatar.

Pose Space Dimensionality Reduction for Pose Space Deformation of a Virtual Character As discussed herein, a virtual character can be animated using rigging elements, such as a deformable mesh and one or more underlying skeletal systems. For example, the joints of a core skeletal system can be transformed to various positions and/or orientations (e.g., using translation and/or rotation transforms) to place the virtual character in a variety of different poses. FIG. 11 shows several arm poses for a virtual character, which in this case is a human avatar. Each of the poses in FIG. 11 is defined by a set of rotation transforms applied to the respective arm joints. The arm joints in the avatar's core skeleton can each be rotated to a selected angle in three-dimensional space to transition the arm from a first pose (e.g., a base pose) to a second pose. In a similar manner, a set of rotation transforms for all of the respective joints in the avatar's core skeleton can define other poses, with each unique set of rotation transforms defining a unique pose.

Euler angles can be used to specify the rotations of the respective joints for different poses of the virtual character's skeletal system. Each joint can be associated with a local coordinate system XYZ. A set of Euler angles can be used to specify rotations of a given joint's local coordinate system XYZ with respect to a reference coordinate system xyz (e.g., the world coordinate system or a coordinate system associated with the joint while the virtual character is in a base pose). The angular orientation of a joint in three-dimensional space can be specified by a set of three Euler angles. In some embodiments, the first Euler angle, $\alpha$, represents the angle between the x axis and the N axis when using the so-called x-convention (or the angle between the y axis and the N axis when using the y-convention), where the N axis is the line of nodes defined by the intersection of the xy and XY planes; the second Euler angle, $\beta$, can represent the angle between the z axis and the Z axis; and the third Euler angle, $\gamma$, can represent the angle between the N axis and the X axis when using the x-convention (or the angle between the N axis and the Y axis when using the y-convention). Euler angles such as these can be used to specify any desired angular orientation of the joint with respect to the reference coordinate system.

A vector of the Euler angles ($\alpha$, $\beta$, $\gamma$) for a joint can be mapped to a 3×3 rotation matrix. Elements of the rotation matrix can correspond to the cosines of the angles between the axes of the local coordinate system XYZ of the joint and the axes of the reference coordinate system xyz. Accordingly, the rotation matrix can be referred to as a direction cosine matrix.

Sets of Euler angles can be used to describe different poses of a virtual character's skeletal system. For example, if the skeletal system includes M joints, and if the angular orientation of each joint in the pose is defined by three Euler angles ($\alpha$, $\beta$, $\gamma$), then a pose can be specified by a vector $x=[\alpha_1, \beta_1, \gamma_1 \ldots \alpha_M, \beta_M, \gamma_M]$.

Various example poses, each specified by a unique vector, x, can be used in a rigging technique called pose space deformation in order to determine mesh deformations for a virtual character. Pose space deformation is a rigging technique that is based on the assumption that the deformation of the virtual character's mesh is a function of the character's pose. Thus, pose space deformation can be used to compute the deformation of the virtual character's mesh based on an input of the character's pose.

A pose space deformer can be trained using machine learning techniques. The training data can include mesh deformations (e.g., deformations of skin, muscles, clothing, etc.) which are specified for multiple example poses of a virtual character's underlying skeletal system, such as the character's core skeleton. The mesh deformations associated with the example poses can be obtained by, for example, scanning a posed physical model of the virtual character. The example poses collectively make up a pose space. Once the pose space deformer is trained using the example poses, the deformations of other poses (which may be specified by, for example, an animation sequence) can be computed by interpolation (e.g., using radial basis functions). In particular, the pose space deformer can be provided with inputs corresponding to the respective rotational states of the joints of the virtual character's underlying skeletal system. Based on these inputs, the pose space deformer can calculate interpolated mesh deformations for the input pose based on the example poses in the pose space.

The pose space can consist of N poses ($x_1, x_2 \ldots x_N$), where N is any positive integer and is referred to as the dimensionality of the pose space. The dimensionality of the pose space is the number of example poses used to train the pose space deformer. High-dimensional pose spaces can be advantageous because they can be used to achieve realistic, high fidelity mesh deformations. However, high-dimensional pose spaces may disadvantageously require large amounts of computing resources, such as computer memory and/or storage. The dimensionality of the pose space can be reduced to conserve computing resources by simply including fewer example poses in the pose space. However, this approach may negatively impact the fidelity of the mesh deformations which are calculated by the pose space deformer. It would therefore be advantageous if the dimensionality of the pose space could be reduced while still allowing the pose space deformer to produce realistic mesh deformations.

This application describes techniques for reducing the dimensionality of an input pose space in a manner which diminishes the effect of the lower dimensionality on the fidelity of the mesh deformations calculated via pose space deformation. In some embodiments, multiple example poses which are part of the input pose space can be clustered together and a single representative pose for the entire cluster can be used in an output pose space. This clustering can be accomplished using, for example, a k-means clustering technique. K-means clustering is a technique that can partition the example poses which make up the input pose space into k clusters. Each of the k clusters can be characterized by a mean. Each example pose in the input pose space can be considered to belong to the cluster whose mean is most similar, according to a selected metric, to that particular example pose. The process of determining cluster means and assigning each example pose to a cluster can be repeated iteratively.

The mean of each of the k clusters can correspond to a pose that can be considered to be representative of the cluster as a whole. Thus, the mean pose for each cluster can be substituted in the output pose space in place of all the example poses belonging to that particular cluster.

As part of the clustering process, each of the example poses in the input pose space can be mapped to a point in multi-dimensional space. As already discussed, each pose can be represented by a vector of Euler angles, $x=[\alpha_1, \beta_1, \gamma_1 \ldots \alpha_M, \beta_M, \gamma_M]$. The elements in this vector, x, can be considered as coordinates in the multi-dimensional space. Thus, the vectors $x_1 \ldots x_N$ for the N example poses in the input pose space can each be used to define a point in space for the respective example pose. These points can be grouped into clusters using a metric that is indicative of the similarity of each point to the various clusters. This metric can be, for example, the distance from a point—which corresponds to a particular pose—to the center of a particular cluster in the multi-dimensional space. The center of a cluster can be calculated as, for example, the mean point, or centroid, of the cluster.

Other metrics can also be used to determine the similarity of a particular example pose to a particular cluster. For example, in some embodiments, a weighted distance metric can be used. In such embodiments, some joints in the skeletal system can be weighted to more heavily influence the distance metric, while others can be weighted to less heavily influence the distance metric.

Since the poses which are clustered together are similar to one another, as determined by the selected metric, a representative pose for each cluster can be used in the output pose space in place of all the poses belonging to that particular cluster. When a set of N example poses is partitioned into k clusters, then the dimensionality of the input pose space can be reduced from N to k, where k is a positive integer less than N.

There is, however, a complication which can occur when the example poses are mapped to points in the multi-dimensional space based on the corresponding vectors of Euler angles. A mathematical singularity can occur when, for example, the second Euler angle, $\beta$, for a given joint is 90°. This singularity results in multiple possible 3-value sets of Euler angles (e.g., an infinite number of 3-value sets of Euler angles) which represent the same angular rotation of the joint. For example, the set of Euler angles (45°, 90°, 45°) represents the same rotation as the set of Euler angles (90°, 90°, 90°).

A pose which includes a joint rotation that is affected by such a mathematical singularity may therefore be mapped to any of multiple different points in space when Euler angles are used as the coordinates in that space. Since such a pose may be mapped to any of multiple different points in space, it may be grouped into different clusters depending upon the particular set of Euler angles—amongst multiple equivalent possibilities—which happens to be specified. This means dissimilar poses may be clustered together or, conversely, similar poses may be grouped into separate clusters. The singularities which can occur when representing angular rotations using Euler angles can therefore corrupt the clustering process, which can in turn negatively impact the fidelity of mesh deformations calculated by the pose space deformer.

To avoid the clustering complexities which may arise from the mathematical singularities that can occur when representing joint rotations using Euler angles, a singularity-free representation of the angular rotations of the joints in the various example poses which make up the input pose space can instead be used. Quaternions are an example of such a singularity-free representation. Thus, in some embodiments, the joint rotations for the example poses in the input pose space are specified using quaternions for clustering purposes.

A quaternion can be represented by a vector $q=[x, y, z, w]$, where a vector $v=[x, y, z]$ defines the axis of rotation of the joint and $\theta$=acos (w) defines the angle of rotation about that axis. The type of mathematical singularity that affects Euler angle representations does not affect quaternion representations. Accordingly, the various example poses which make up the input pose space can be clustered more accurately when they are represented as quaternions than when the example poses are represented using Euler angles.

Figure 12A:
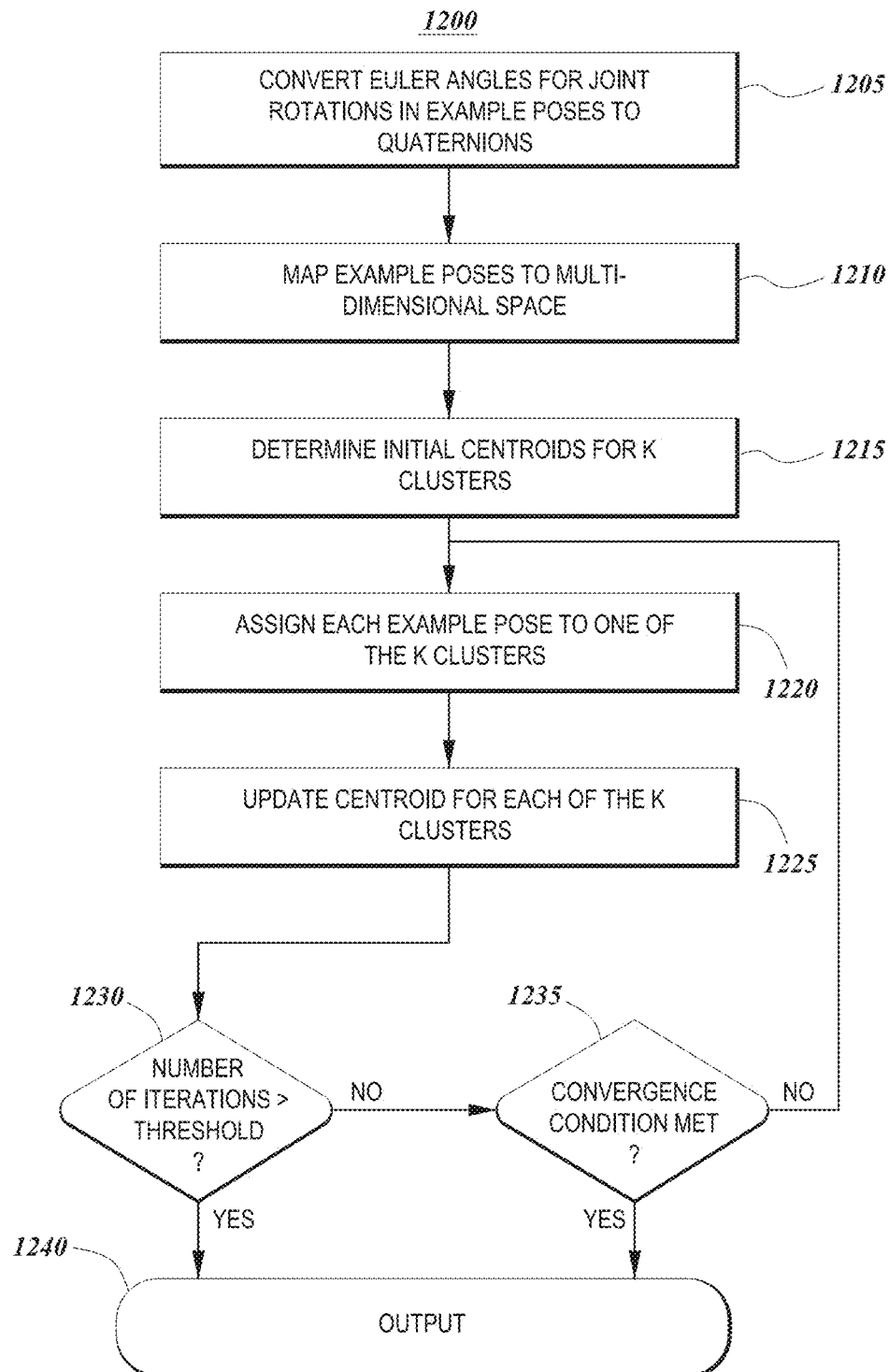
FIG. 12A illustrates a method for reducing the dimensionality of an input pose space for a pose space deformer using k-means clustering.
Figure 12B:
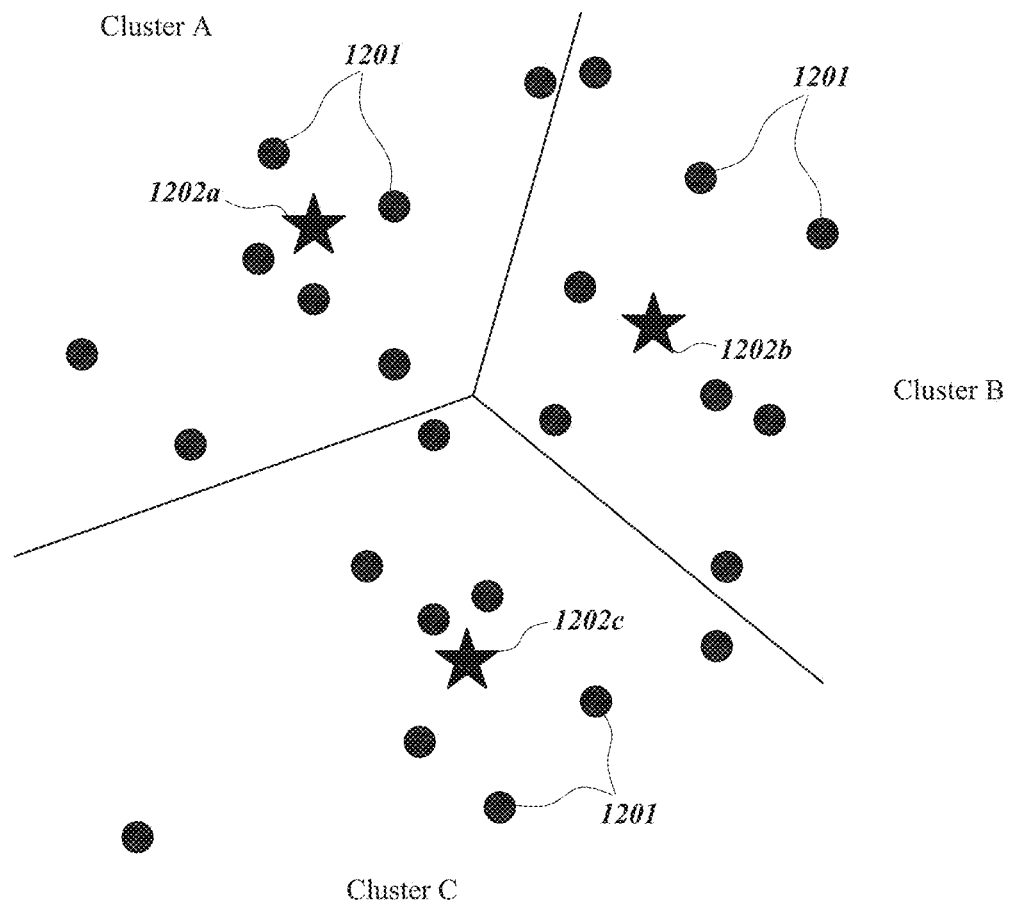
FIG. 12B illustrates an example set of clusters formed using the method of FIG. 12A.

FIG. 12A illustrates a method 1200 for reducing the dimensionality of an input pose space for a pose space deformer using k-means clustering. The method 1200 can be performed by a hardware computer processor that executes instructions stored in a non-transitory storage medium. FIG. 12B illustrates an example set of clusters formed using the method of FIG. 12A.

According to the method 1200, the angular rotations of the joints in a skeletal system for a virtual character are represented using quaternions. Thus, any example pose whose joint rotations are initially represented using Euler angles can be converted to instead use quaternion representations, as shown in block 1205. After this conversion, each of the joint rotations can be represented with a vector of the form $q=[x, y, z, w]$, and each pose can be made up of M joint rotations and can be represented by a vector $x=[x_1, y_1, z_1, w_1, \ldots x_M, y_M, z_M, w_M]$, where M is the number of joints in the skeletal system and can be any positive integer.

Once the Euler angles for the joint rotations are converted to quaternions, at block 1210 each example pose in the input pose space can be mapped to a point in multi-dimensional space. Each example pose can be represented by a vector of the form $x=[x_1, y_1, z_1, w_1, \ldots x_M, y_M, z_M, w_M]$. The elements of the vector for each pose can be used as coordinates to map that pose to a point in the multi-dimensional space for clustering purposes. The input pose space can include N example poses and each of the vectors $x_1 \ldots x_N$ can be used to define a point in space for the respective example pose. FIG. 12B shows a set of example poses mapped to points in space, where each dot 1201 represents an example pose.

At block 1215, the hardware computer processor can determine initial mean points, or centroids, in the multi-dimensional space for k clusters, where k is any positive integer. (The value for k can be determined using a technique described below with respect to FIG. 13.) In some embodiments, the initial positions of the k centroids are selected at different random locations in the multi-dimensional space. However, other techniques can also be used to determine the initial positions of the k centroids. For example, each of the k clusters can have an initial centroid location that is based on one of the example poses in the input pose space. In such cases, one example pose can be selected (whether randomly or in a predetermined manner) and assigned to each of the k clusters. The coordinates of the initial centroid for each cluster can be determined by the set of quaternions for the example pose selected for that cluster.

At block 1220, each of the example poses which collectively make up the input pose space can be assigned to one of the k clusters. In some embodiments, the assignment can be based on the geometric distances between the cluster centroids and the points which correspond to the example poses. For example, the hardware computer processor can calculate the geometric distance between each of the cluster centroids and each of the points corresponding to the example poses. The hardware computer processor can then assign each example pose to the cluster whose centroid is the nearest.

Once each of the example poses in the pose space has been assigned to one of the k clusters, at block 1225 the hardware computer processor can re-calculate the centroid for each cluster. The updated centroid for each of the k different clusters can be calculated by finding the mean value of the quaternions $q_i=[x_i, y_i, z_i, w_i]$ currently assigned to that cluster. According to quaternion arithmetic, the mean, m, of n quaternions, $q_1, q_2, \ldots q_n$ can be calculated by the expression $$m = \exp\left[\frac{\sum_{i=1}^{n} \log(q_i)}{n}\right],$$

where $$\log(q_i) = \left[\frac{\theta_i}{|v_i|}x_i, \frac{\theta_i}{|v_i|}y_i, \frac{\theta_i}{|v_i|}z_i\right],$$

$$v = [x_i, y_i, z_i],$$

and $\theta = \mathrm{acos}(w_i)$.

The process of assigning example poses to clusters (block 1220) and updating cluster centroids (block 1225) can be repeated until the number of iterations exceeds a threshold value, as shown in block 1230, or until a convergence condition is satisfied, as shown in block 1235. The convergence condition can be considered to be satisfied if, for example, the assignments of the various example poses to the k clusters do not change from one iteration to the next.

FIG. 12B illustrates an example outcome of this clustering process for the case where k=3. Each of the example poses is represented by a dot 1201. Each of the example poses has been assigned to Cluster A, Cluster B, or Cluster C. The boundaries between clusters are delineated by lines. The centroid of each cluster is represented by a star 1202a-c, where the centroid of Cluster A is 1202a, the centroid of Cluster B is 1202b, and the centroid of Cluster C is 1202c.

Once each example pose in the input pose space has been finally assigned to one of the k clusters, the hardware computer processor can specify one example pose to represent each cluster in the output pose space. In some embodiments, the representative pose for a particular cluster can be one of the example poses assigned to that cluster. For instance, the example pose whose corresponding point in multi-dimensional space is located closest to the centroid of that cluster can be specified as the representative pose for the entire cluster. In other embodiments, the coordinates of the centroid of the cluster can be specified as the joint rotations for the representative pose.

In this manner, the dimensionality of the input pose space can be reduced from N example poses to k example poses, where k is the number of clusters. Further, since the clustered example poses are similar to one another, the effect of the reduced dimensionality of the pose space on the fidelity of mesh deformations calculated by the pose space deformer can be less than if the dimensionality of the pose space were reduced in a less sophisticated manner (e.g., by randomly selecting a sub-set of the example poses from the input pose space). The reduced dimensionality of the output pose space can facilitate high fidelity, real-time computations of mesh deformations in response to changes in the virtual character's pose.

The effectiveness of the method 1200 shown in FIG. 12A may, however, be sensitive to the number of clusters into which the example poses from the input pose space are grouped. If the example poses which collectively make up the input pose space are clustered into a relatively large number of clusters, then the fidelity of the pose space deformation will be reduced by a relatively small amount. However, the dimensionality of the input pose space will likewise only be reduced by a relatively small amount. In contrast, if the example poses are clustered into a relatively small number of clusters, then the dimensionality of the input pose space will be reduced by relatively large amount, but the fidelity of the pose space deformation may also be reduced by relatively large amount. Since the reduction in the dimensionality of the input pose space depends on the number of clusters (i.e., the value of k), it may be advantageous to select a number of clusters which strikes an effective balance between the reduction in the dimensionality of the input pose space and the resulting fidelity of the pose space deformation.

Various factors can complicate the choice of the number of clusters. One of these factors is the distribution of the example poses in the input pose space. For example, if the various example poses in the input pose space are distributed widely such that the various example poses are relatively dissimilar from one another, then a larger number of clusters may be needed to partition the different example poses while still maintaining an acceptable degree of fidelity in the calculated deformations of the virtual character's mesh. However, if the distribution of the various example poses in the input pose space is narrow such that the various example poses are relatively similar, then a smaller number of clusters may be needed to partition the different example poses while still maintaining the desired degree of fidelity in the mesh deformations.

When the number of clusters is chosen appropriately, the dimensionality of the input pose space can be reduced while maintaining a desired degree of fidelity in the mesh deformations calculated by the pose space deformer. In fact, in some embodiments, the fidelity of mesh deformations calculated with the reduced-dimensionality output pose space may be comparable to that which can be achieved using the higher-dimensional input pose space.

One technique for choosing the number of clusters is to perform the method 1200 shown in FIG. 12A for multiple different candidate values of k, to calculate an error metric associated with each candidate value of k, and then to select a value for k based on the error metrics associated with the candidate values. In some embodiments, the error metric is the sum, for all of the example poses in the input pose space, of the squared distance between the point corresponding to each example pose and the centroid of its assigned cluster. This error metric can be referred to as the sum of squared errors. Other error metrics can also be used, however.

Figure 13:
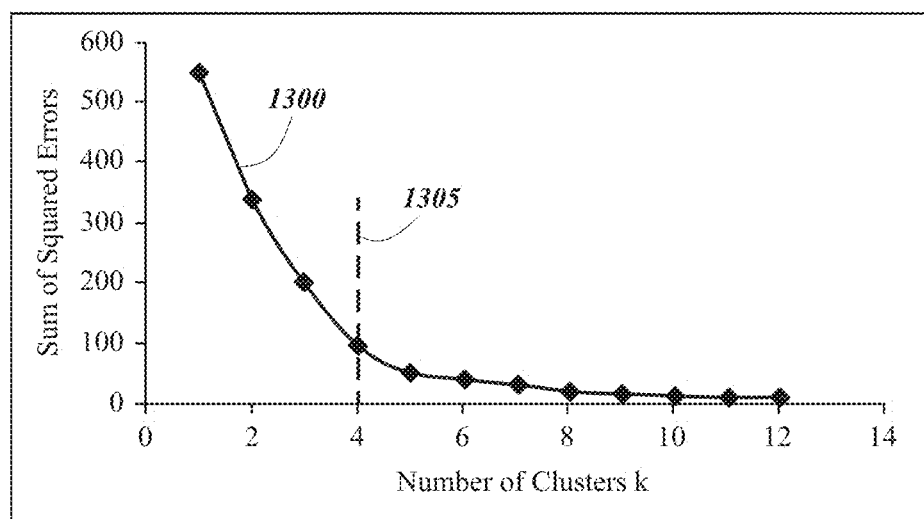
FIG. 13 is a graph which illustrates an example technique for selecting the number of clusters to use for reducing the dimensionality of an input pose space.

FIG. 13 is a graph which illustrates an example technique for selecting the number of clusters to use for reducing the dimensionality of an input pose space. FIG. 13 plots an example curve 1300 of the sum of squared errors as a function of the value of k. To generate the data shown by the example curve 1300, the hardware computer processor can perform the method 1200 shown in FIG. 12A for each of multiple candidate values of k. In the illustrated example, the candidate values are k=1 through k=12. Other ranges of candidate values can be used in other embodiments, depending upon the particular application. The hardware computer processor can then calculate the sum of squared errors for each of the candidate values.

The sum of squared errors is relatively large when the number of clusters, k, is relatively small. As the value of k increases, the sum of squared errors decreases and starts to approach zero. It is often the case that the sum of squared errors initially decreases rapidly with an increasing number of clusters. This is shown by the steep slope of the curve 1300 for lower candidate values of k. The rate of decline will typically slow at some point. This is evident from the reduction in the slope of the curve 1300 for higher candidate values of k. The sum of squared errors ultimately becomes zero once the candidate value of k equals the number of example poses in the input pose space, since in that case each input pose sample constitutes its own cluster. Conversely, the largest sum of squared errors is typically when k=1, meaning that all of the example poses are placed in a single cluster.

In some embodiments, the value of k used to generate the output pose space can be selected based on its error metric satisfying a selected criterion. For example, the criterion can be that the rate of change of the error metric passes a designated threshold. With reference to FIG. 13, the rate of change of the error metric can be determined by analyzing the slope of the curve 1300. The slope of the curve 1300 between pairs of adjacent candidate values of k can be calculated and the candidate value of k at which the slope passes a designated threshold can be selected as the value for k. With reference to FIG. 13, the slope of the curve 1300 can be calculated between k=1 and k=2, between k=2 and k=3, between k=3 and k=4, between k=4 and k=5, and so on. The value of k where the slope of the curve passes the designated threshold—in this case k=4, as indicated by the line 1305—can be selected as the value for the number of clusters. In some embodiments, the magnitude of the threshold rate of change can be from about 0 to about 1 (i.e., from about 0° to 45°), though other thresholds can also be used.

Table 1 shows an example of several reduced-dimensionality pose spaces generated by the example method depicted in FIG. 12A.

TABLE 1

| Pose Space Deformer | Input Pose Space Dimensionality | Output (Clustered) Pose Space Dimensionality |
|---|---|---|
| Deltoid/Pectoral Muscles | 1944 | 1189 |
| Scapula | 9 | 9 |
| Trapezius Muscle | 405 | 226 |
| Trapezius Up | 405 | 271 |
| Latissimus Dorsi Muscle | 1125 | 667 |

TABLE 1-continued

| Pose Space Deformer | Input Pose Space Dimensionality | Output (Clustered) Pose Space Dimensionality |
|---|---|---|
| Sternocleidomastoid & Scalene Muscles | 45 | 45 |
| Bicep Muscle & Forearm | 864 | 535 |
| Hip | 216 | 127 |
| Quadriceps Muscle | 1296 | 757 |
| Hamstring Muscle | 6 | 6 |
| Calf Muscle | 576 | 361 |
| Total: | 6891 | 4193 |

As shown in Table 1, an example of an input pose space for calculating pose-based deformations of the deltoid and pectoral muscles for a human avatar includes 1944 poses. This was reduced to 1189 poses in the output pose space using the techniques described herein. Similarly, an example input pose space for calculating deformations of the quadriceps muscles initially included 1296 poses but was reduced to 757 poses. Comparable results were obtained for various other muscles and body parts of the avatar virtual character, such as the trapezius, latissimus dorsi, bicep, and calf muscles, as well as the hip. There were, however, exceptions for the input pose spaces for the scapula, the sternocleidomastoid and scalene muscles, and the hamstring muscle. The dimensionality of these pose spaces was not reduced because the respective input pose spaces included only a relatively few example poses, thus making clustering less effective. Overall, for the pose spaces illustrated in Table 1, the number of input poses was reduced from 6891 to 4193. In some embodiments, by using the techniques described herein, the dimensionality of the input pose space can be reduced by 30% or more, or by 40% or more, or by 50% or more. Further, the output pose space can still represent 70% or more, or 80% or more, or 90% or more of the information in the input pose space.

Compression of Blendshapes Using Principal Component Analysis

In some embodiments, a pose space deformer can control weights for one or more blendshapes that are used to deform the mesh of a virtual character. The blendshapes can be represented as an N×M deformation matrix, A, which includes delta values for deforming the mesh. Each of the M columns of the deformation matrix can correspond to a particular vertex in the mesh and each of the N rows can correspond to a set of vertices which make up a blendshape. For virtual characters with high resolution meshes and numerous blendshapes, the deformation matrix can become quite large and can consume significant computing resources. Thus, it would be advantageous to reduce the size of the deformation matrix while still providing high fidelity mesh deformations.

Techniques are described herein for reducing the dimensionality of an input deformation matrix (i.e., reducing the number of blendshapes in the deformation matrix) using Principal Component Analysis (PCA). PCA can be used to accomplish this aim without losing more than a specified amount of the variation, or information, contained in the input deformation matrix.

The column of delta values in the input deformation matrix for each vertex in the mesh can be used to define a point in N-dimensional space, where N is equal to the number of blendshapes in the input deformation matrix.

PCA can be used to calculate a set of basis vectors for the input deformation matrix, meaning that each of the points in N-dimensional space can be expressed as a linear combination of the basis vectors. These basis vectors are the principal components of the input deformation matrix and have the property that the first principal component has the largest possible variance, and each succeeding principal component has the next highest variance possible, subject to the constraint of being orthogonal to all of the preceding principal components. For example, if all of the points that are specified by the input deformation matrix in N-dimensional space are plotted, then the first principal component is a vector that points in the direction of greatest variance between the points. The second principal component is orthogonal to the first principal component and points in the direction of greatest variance amongst the points specified by the input deformation matrix, subject to the orthogonality constraint with the first principal component. The third principal component is orthogonal to both the first principal component and the second principal component. The third principal component points in the direction of greatest variance, subject to the orthogonality constraint with the first and second principal components. And so on for each of the N principal components of the input deformation matrix. Each of the principal components also has an associated eigenvalue which is indicative of the amount of variation in the input data that occurs in the direction of the associated eigenvector.

Figure 14:
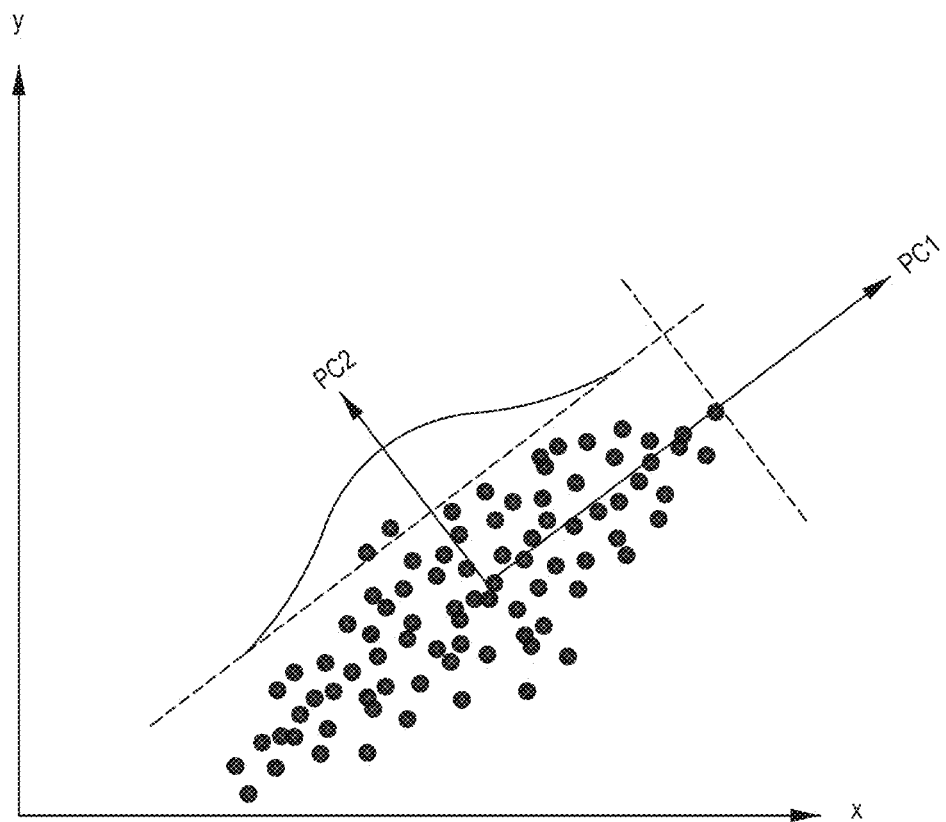
FIG. 14 illustrates an example set of plotted points for an input deformation matrix with N blendshapes.

FIG. 14 illustrates an example set of plotted points for an input deformation matrix with N blendshapes. As just discussed, each of the points is a point in N-dimensional space. Although the deformation matrix can include many blendshapes (e.g., N equals tens, hundreds, or thousands of blendshapes), for ease of illustration FIG. 14 shows the points projected in the plane of the first two principal components. As seen in FIG. 14, the first principal component, PC1, points in the direction of greatest variation between the plotted points. The second principal component, PC2, points in the direction of next greatest variation, subject to the constraint that it is orthogonal to the first principal component, PC1. Although not illustrated, the same would be true of the subsequent principal components. Each of the points in FIG. 14 can be expressed as a linear combination of the principal components. The first principal component can be used to define a new blendshape that accounts for most of the variation in the input deformation matrix. The second principal component can be used to define another new blendshape that accounts for the next largest amount of variation in the input deformation matrix. And so on for the remaining principal components.

Figure 15:
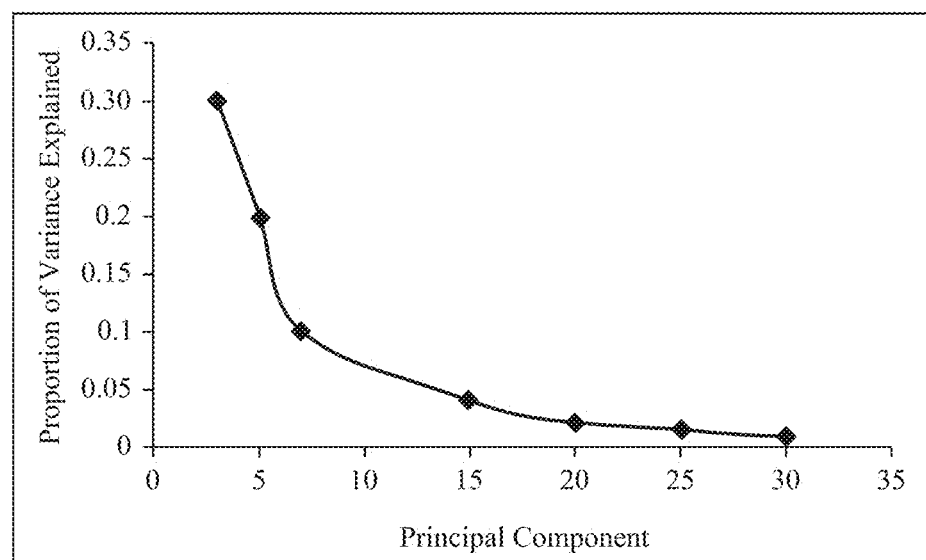
FIG. 15 is an example plot of the proportion of variance accounted for by each of the 30 principal components for an input deformation matrix made up of 30 blendshapes.

For an N-dimensional input deformation matrix, each of the N principal components can be used to define a new blendshape. These new blendshapes can be organized in an output deformation matrix, A'. Each successive new blendshape accounts for less of the variation in the input deformation matrix than the previous. This is illustrated in FIG. 15, which is an example plot of the proportion of variance accounted for by each of the 30 principal components for an input deformation matrix made up of 30 blendshapes. As is evident from the figure, the proportion of variance accounted for by each principal component decreases as the number of the principal component increases. The last several principal components account for a relatively small amount of the variation in the input deformation matrix. Since principal component N includes the least amount of information from the input deformation matrix, it and its corresponding blendshape can be omitted from the output deformation matrix in some embodiments. In a similar manner, the principal components (N-1), (N-2), etc. can also be omitted from the output deformation matrix, along with their corresponding blendshapes, depending upon the amount of information desired to be retained from the input deformation matrix. This process of omitting the blendshape(s) corresponding to the last principal component(s) reduces the dimensionality of the output deformation matrix while retaining at least a designated amount of the information from the input deformation matrix.

The principal components of the input deformation matrix can be calculated in multiple different ways. In some embodiments, the covariance matrix or the correlation matrix of the input deformation matrix, A, can be calculated. An eigen-decomposition can then be performed on the covariance matrix or the correlation matrix. This eigen-decomposition of the covariance matrix or the correlation matrix gives a set of linearly independent eigenvectors. These eigenvectors (which can be normalized to unit length) are the principal components. The principal components can also be calculated with other techniques, such as Singular Value Decomposition (SVD). In addition to the principal components, SVD produces a set of values called singular values. The singular value for each principal component is indicative of the amount of variation in the input deformation matrix that is explained by that principal component.

Figure 16:
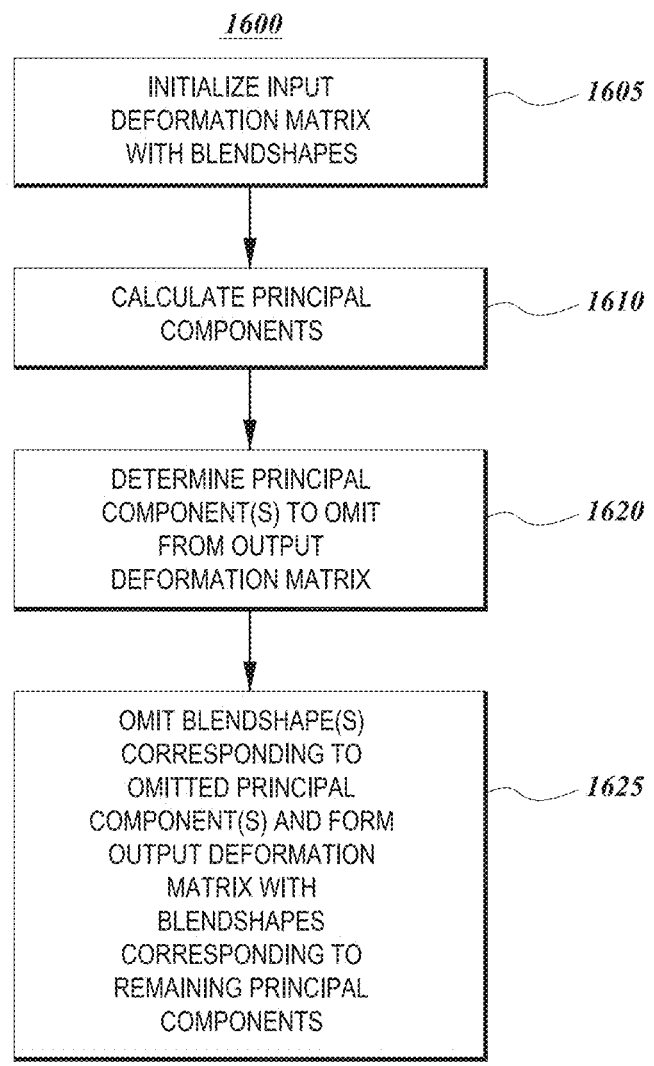
FIG. 16 is a flowchart depicting an example method of reducing the dimensionality of a deformation matrix using principal component analysis (PCA).

FIG. 16 is a flowchart depicting an example method of reducing the dimensionality of a deformation matrix using principal component analysis (PCA). This method can be performed by a hardware computer processor that executes instructions stored in a non-transitory storage medium. The method begins at block 1605 where the input deformation matrix is initialized as an N×M matrix of blendshapes. The N principal components of the input deformation matrix are then calculated, as shown in block 1610. As already discussed, each of the principal components is associated with a new blendshape. Depending on the percentage of the data to be retained from the input deformation matrix, a number of the principal components are omitted, as shown in block 1620. The number of omitted principal components can be selected based on the percentage of the variation in the input deformation matrix that is explained by each principal component. In some embodiments, the number of retained principal components can be based on a user preference for the percentage of variance to be retained, a number of new blendshapes which is computationally performant, and/or a number of new blendshapes which is judged to result in mesh deformations which are aesthetically acceptable. Finally, at block 1625, the blendshapes corresponding to the omitted principal components are also omitted and an output deformation matrix, A', is formed from the new blendshapes associated with the remaining principal components.

The blendshapes in the output deformation matrix, A', can be controlled by a pose space deformer. Since the techniques described herein allow a designated amount of the information from the input deformation matrix to be retained, these techniques can advantageously reduce the number of blendshapes needed to achieve acceptable mesh deformations.

EXAMPLE EMBODIMENTS

1. A system comprising: non-transitory computer storage for storing a plurality of example poses of a skeletal system for a virtual character; and a hardware computer processor in communication with the non-transitory computer storage, the hardware computer processor being configured to reduce a dimensionality of the input pose space by executing a method comprising: clustering the plurality of example poses into one or more clusters, the plurality of example poses defining an input pose space, each of the plurality of example poses comprising a set of joint rotations, the joint rotations having a singularity-free mathematical representation; determining a representative pose for each cluster; and providing an output pose space with a reduced dimensionality as compared to the input pose space.

2. The system of claim 1, wherein the singularity-free mathematical representation of the joint rotations comprises a quaternion representation.

3. The system of claim 2, further comprising: receiving the plurality of example poses with the joint rotations having an Euler angle representation; and converting the Euler angle representation to the quaternion representation.

4. The system of claim 1, wherein the example poses are clustered into the one or more clusters based on a metric to determine the similarity between each example pose and each cluster.

5. The system of claim 1, wherein clustering the example poses comprises mapping each of the example poses to a point in multi-dimensional space.

6. The system of claim 5, wherein clustering the example poses further comprises: determining a centroid for each cluster; determining a distance between the point for each example pose and the centroid of each cluster; and assigning each example pose to the nearest cluster.

7. The system of claim 6, further comprising iteratively determining the centroid for each cluster and assigning each example pose to the nearest cluster.

8. The system of claim 6, wherein the representative pose for each cluster comprises one of the example poses assigned to that cluster or an example pose associated with the centroid of that cluster.

9. The system of claim 1, further comprising determining the number of clusters.

10. The system of claim 9, wherein determining the number of clusters comprises: clustering the plurality of example poses into the one or more clusters for each of a plurality of different candidate numbers of clusters; calculating an error metric associated with each candidate numbers of clusters; and selecting one of the candidate numbers of clusters based on the error metrics associated with the candidate numbers of clusters.

11. The system of claim 10, wherein the error metric comprises a sum, for all of the example poses in the input pose space, of the squared distance between a point corresponding to each example pose and a centroid of its assigned cluster.

12. The system of claim 10, wherein selecting one of the candidate numbers of clusters comprises determining whether its error metric satisfies a selected criterion.

13. The system of claim 12, wherein the criterion is that the rate of change of the error metric passes a designated threshold.

14. The system of claim 1, further comprising training a pose space deformer using the output pose space.

15. The system of claim 14, further comprising calculating mesh deformations for a virtual character using the pose space deformer.

16. The system of claim 14, further comprising controlling a plurality of blendshapes in an output deformation matrix using the pose space deformer.

17. The system of claim 16, wherein the output deformation matrix is generated by reducing a dimensionality of an input deformation matrix using Principal Component Analysis.

18. The system of claim 17, wherein reducing the dimensionality of the input deformation matrix comprises: determining principal components of the input deformation matrix; omitting one or more of the principal components to leave one or more remaining principal components; generating the output deformation matrix using one or more blendshapes associated with the one or more remaining principal components.

19. The system of claim 1, wherein the output pose space is at least 30% smaller than the input pose space.

20. The system of claim 1, wherein the system comprises a virtual reality, augmented reality, or mixed reality display system.

21. A method comprising: obtaining a plurality of example poses of a skeletal system for a virtual character, the plurality of example poses defining an input pose space, each of the plurality of example poses comprising a set of joint rotations, the joint rotations having a singularity-free mathematical representation; clustering the plurality of example poses into one or more clusters; determining a representative pose for each cluster; and providing an output pose space with a reduced dimensionality as compared to the input pose space.

22. The method of claim 21, wherein the singularity-free mathematical representation of the joint rotations comprises a quaternion representation.

23. The method of claim 22, further comprising: receiving the plurality of example poses with the joint rotations having an Euler angle representation; and converting the Euler angle representation to the quaternion representation.

24. The method of claim 21, wherein the example poses are clustered into the one or more clusters based on a metric to determine the similarity between each example pose and each cluster.

25. The method of claim 21, wherein clustering the example poses comprises mapping each of the example poses to a point in multi-dimensional space.

26. The method of claim 25, wherein clustering the example poses further comprises: determining a centroid for each cluster; determining a distance between the point for each example pose and the centroid of each cluster; and assigning each example pose to the nearest cluster.

27. The method of claim 26, further comprising iteratively determining the centroid for each cluster and assigning each example pose to the nearest cluster.

28. The method of claim 26, wherein the representative pose for each cluster comprises one of the example poses assigned to that cluster or an example pose associated with the centroid of that cluster.

29. The method of claim 21, further comprising determining the number of clusters.

30. The method of claim 29, wherein determining the number of clusters comprises: clustering the plurality of example poses into the one or more clusters for each of a plurality of different candidate numbers of clusters; calculating an error metric associated with each candidate numbers of clusters; and selecting one of the candidate numbers of clusters based on the error metrics associated with the candidate numbers of clusters.

31. The method of claim 30, wherein the error metric comprises a sum, for all of the example poses in the input pose space, of the squared distance between a point corresponding to each example pose and a centroid of its assigned cluster.

32. The method of claim 30, wherein selecting one of the candidate numbers of clusters comprises determining whether its error metric satisfies a selected criterion.

33. The method of claim 32, wherein the criterion is that the rate of change of the error metric passes a designated threshold.

34. The method of claim 21, further comprising training a pose space deformer using the output pose space.

35. The method of claim 34, further comprising calculating mesh deformations for a virtual character using the pose space deformer.

36. The method of claim 34, further comprising controlling a plurality of blendshapes in an output deformation matrix using the pose space deformer.

37. The method of claim 36, wherein the output deformation matrix is generated by reducing a dimensionality of an input deformation matrix using Principal Component Analysis.

38. The method of claim 37, wherein reducing the dimensionality of the input deformation matrix comprises: determining principal components of the input deformation matrix; omitting one or more of the principal components to leave one or more remaining principal components; generating the output deformation matrix using one or more blendshapes associated with the one or more remaining principal components.

39. The method of claim 21, wherein the output pose space is at least 30% smaller than the input pose space.

40. The method of claim 21, wherein the method is performed by a virtual reality, augmented reality, or mixed reality display system.

41. A non-transitory computer-readable medium which, when read by a hardware computer processor, causes the hardware computer processor to perform a method comprising: obtaining a plurality of example poses of a skeletal system for a virtual character, the plurality of example poses defining an input pose space, each of the plurality of example poses comprising a set of joint rotations, the joint rotations having a singularity-free mathematical representation; clustering the plurality of example poses into one or more clusters; determining a representative pose for each cluster; and providing an output pose space with a reduced dimensionality as compared to the input pose space.

42. The computer-readable medium of claim 41, wherein the singularity-free mathematical representation of the joint rotations comprises a quaternion representation.

43. The computer-readable medium of claim 42, wherein the method further comprises: receiving the plurality of example poses with the joint rotations having an Euler angle representation; and converting the Euler angle representation to the quaternion representation.

44. The computer-readable medium of claim 41, wherein the example poses are clustered into the one or more clusters based on a metric to determine the similarity between each example pose and each cluster.

45. The computer-readable medium of claim 41, wherein clustering the example poses comprises mapping each of the example poses to a point in multi-dimensional space.

46. The computer-readable medium of claim 45, wherein clustering the example poses further comprises: determining a centroid for each cluster; determining a distance between the point for each example pose and the centroid of each cluster; and assigning each example pose to the nearest cluster.

47. The computer-readable medium of claim 46, wherein the method further comprises iteratively determining the centroid for each cluster and assigning each example pose to the nearest cluster.

48. The computer-readable medium of claim 46, wherein the representative pose for each cluster comprises one of the example poses assigned to that cluster or an example pose associated with the centroid of that cluster.

49. The computer-readable medium of claim 41, wherein the method further comprises determining the number of clusters.

50. The computer-readable medium of claim 49, wherein determining the number of clusters comprises: clustering the plurality of example poses into the one or more clusters for each of a plurality of different candidate numbers of clusters; calculating an error metric associated with each candidate numbers of clusters; and selecting one of the candidate numbers of clusters based on the error metrics associated with the candidate numbers of clusters.

51. The computer-readable medium of claim 50, wherein the error metric comprises a sum, for all of the example poses in the input pose space, of the squared distance between a point corresponding to each example pose and a centroid of its assigned cluster.

52. The computer-readable medium of claim 50, wherein selecting one of the candidate numbers of clusters comprises determining whether its error metric satisfies a selected criterion.

53. The computer-readable medium of claim 52, wherein the criterion is that the rate of change of the error metric passes a designated threshold.

54. The computer-readable medium of claim 41, wherein the method further comprises training a pose space deformer using the output pose space.

55. The computer-readable medium of claim 54, wherein the method further comprises calculating mesh deformations for a virtual character using the pose space deformer.

56. The computer-readable medium of claim 54, wherein the method further comprises controlling a plurality of blendshapes in an output deformation matrix using the pose space deformer.

57. The computer-readable medium of claim 56, wherein the output deformation matrix is generated by reducing a dimensionality of an input deformation matrix using Principal Component Analysis.

58. The computer-readable medium of claim 57, wherein reducing the dimensionality of the input deformation matrix comprises: determining principal components of the input deformation matrix; omitting one or more of the principal components to leave one or more remaining principal components; generating the output deformation matrix using one or more blendshapes associated with the one or more remaining principal components.

59. The computer-readable medium of claim 41, wherein the output pose space is at least 30% smaller than the input pose space.

60. The computer-readable medium of claim 41, wherein the method is performed by a virtual reality, augmented reality, or mixed reality display system.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   non-transitory computer storage for storing a plurality of example poses of a skeletal system for a virtual character; and
   a hardware computer processor in communication with the non-transitory computer storage, the hardware computer processor being configured to reduce a dimensionality of an input pose space by executing a method comprising:
      clustering the plurality of example poses into one or more clusters, the plurality of example poses defining the input pose space, each of the plurality of example poses comprising a set of joint rotations;
      determining a representative pose for each cluster; and
      providing an output pose space with a reduced dimensionality as compared to the input pose space.

2. The system of claim 1, wherein the example poses are clustered into the one or more clusters based on a metric to determine similarity between each example pose and each cluster.

3. The system of claim 1, wherein clustering the example poses comprises mapping each of the example poses to a point in multi-dimensional space.

4. The system of claim 3, wherein clustering the example poses further comprises:
   determining a centroid for each cluster;
   determining a distance between the point for each example pose and the centroid of each cluster; and
   assigning each example pose to a nearest cluster.

5. The system of claim 4, further comprising iteratively determining the centroid for each cluster and assigning each example pose to the nearest cluster.

6. The system of claim 4, wherein the representative pose for each cluster comprises one of the example poses assigned to that respective cluster or an example pose associated with the centroid of that respective cluster.

7. The system of claim 1, further comprising determining the number of clusters.

8. The system of claim 7, wherein determining the number of clusters comprises:
   clustering the plurality of example poses into the one or more clusters for each of a plurality of different candidate numbers of clusters;
   calculating an error metric associated with each candidate numbers of clusters; and
   selecting one of the candidate numbers of clusters based on the error metrics associated with the candidate numbers of clusters.

9. The system of claim 8, wherein the error metric comprises a sum, for all of the example poses in the input pose space, of a squared distance between a point corresponding to each example pose and a centroid of its assigned cluster.

10. The system of claim 8, wherein selecting one of the candidate numbers of clusters comprises determining whether the error metric associated with said one of the candidate numbers of clusters satisfies a selected criterion.

11. The system of claim 10, wherein the criterion is that a rate of change of the error metric passes a designated threshold.

12. The system of claim 1, further comprising training a pose space deformer using the output pose space.

13. The system of claim 12, further comprising calculating mesh deformations for a virtual character using the pose space deformer.

14. The system of claim 12, further comprising controlling a plurality of blendshapes in an output deformation matrix using the pose space deformer.

15. The system of claim 14, wherein the output deformation matrix is generated by reducing a dimensionality of an input deformation matrix using Principal Component Analysis.

16. The system of claim 15, wherein reducing the dimensionality of the input deformation matrix comprises:
   determining principal components of the input deformation matrix;
   omitting one or more of the principal components to leave one or more remaining principal components;
   generating the output deformation matrix using one or more blendshapes associated with the one or more remaining principal components.

17. The system of claim 1, wherein the output pose space is at least 30% smaller than the input pose space.

18. The system of claim 1, wherein the system comprises a virtual reality, augmented reality, or mixed reality display system.

19. A method comprising:
   obtaining a plurality of example poses of a skeletal system for a virtual character, the plurality of example poses defining an input pose space, each of the plurality of example poses comprising a set of joint rotations;
   clustering the plurality of example poses into one or more clusters;
   determining a representative pose for each cluster; and
   providing an output pose space with a reduced dimensionality as compared to the input pose space.

* * * * *